US 10,046,727 B2

(12) United States Patent
Hanano et al.

(10) Patent No.: US 10,046,727 B2
(45) Date of Patent: Aug. 14, 2018

(54) GAS GENERATOR

(71) Applicant: DAICEL CORPORATION, Osaka-shi, Osaka (JP)

(72) Inventors: Teppei Hanano, Tatsuno (JP); Masayuki Yamazaki, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/522,507

(22) PCT Filed: Nov. 2, 2015

(86) PCT No.: PCT/JP2015/080874
§ 371 (c)(1),
(2) Date: Apr. 27, 2017

(87) PCT Pub. No.: WO2016/088495
PCT Pub. Date: Jun. 9, 2016

(65) Prior Publication Data
US 2017/0349136 A1    Dec. 7, 2017

(30) Foreign Application Priority Data
Dec. 3, 2014 (JP) .................................. 2014-244613

(51) Int. Cl.
*B60R 21/264* (2006.01)
(52) U.S. Cl.
CPC .................................. *B60R 21/264* (2013.01)
(58) Field of Classification Search
CPC .............. B60R 21/264; B60R 21/2644; B60R 2021/2642
See application file for complete search history.

(56) References Cited

U.S. PATENT DOCUMENTS 3,882,673 A * 5/1975 Doin .......................... B01J 7/00
60/207
7,784,829 B2 * 8/2010 Hirooka .............. B60R 21/2644
280/736
(Continued)

FOREIGN PATENT DOCUMENTS

JP      2007-513818 A     5/2007
JP      2008-174441 A     7/2008
(Continued)

*Primary Examiner* — Faye M Fleming
(74) *Attorney, Agent, or Firm* — Birch, Stewart, Kolasch & Birch, LLP (57) ABSTRACT

The present invention provides a gas generator including a cylindrical housing in which an ignition device is attached at a first end portion thereof and a diffuser portion provided with a gas discharge port is attached at a second end portion thereof, an annular end surface being formed on the side of the second end portion, a cylindrical flow path forming member being disposed in the cylindrical housing, an inner space of the cylindrical flow path forming member being partitioned by a partition wall into a first chamber on the side of the first end portion and a second chamber on the side of the second end portion, a space, which includes the first chamber, being a combustion chamber filled with a gas generating agent, and the second chamber forming part of a gas discharge path, in the cylindrical flow path forming member, a first cylindrical space, which is formed between a first wall surface of the cylindrical flow path forming member on the side of the first chamber and the inner wall surface of the cylindrical housing, and a second cylindrical space, which is formed between a second wall surface of the cylindrical flow path forming member on the side of the second chamber and the inner wall surface of the cylindrical housing, being continuous in an axial direction, and the second cylindrical space being a cylindrical space with a length L from a boundary with the first cylindrical space to (Continued)

the annular end surface, and having an annular pocket portion with a length L1 from the annular end surface to the second communication holes, and at least part of a surface of the annular pocket portion being provided with a concave-convex portion.

8 Claims, 5 Drawing Sheets

(56) References Cited

U.S. PATENT DOCUMENTS

| | | | | |
|---|---|---|---|---|
| 8,087,693 B2 * | 1/2012 | Yamazaki | ............ | B60R 21/261 |
| | | | | 280/741 |
| 8,236,112 B2 * | 8/2012 | Yamazaki | ........... | B60R 21/2644 |
| | | | | 149/2 |
| 8,302,992 B2 * | 11/2012 | Hanano | ................ | B60R 21/262 |
| | | | | 102/531 |
| 8,376,400 B2 * | 2/2013 | Mason | ............... | B60R 21/2644 |
| | | | | 280/736 |
| 8,794,665 B2 * | 8/2014 | Biebl | ................. | B60R 21/2644 |
| | | | | 102/704 |
| 9,950,688 B2 * | 4/2018 | Yamashita | ............ | B60R 21/261 |
| 2005/0110253 A1 | 5/2005 | Khandhadia et al. | | |
| 2008/0078486 A1 | 4/2008 | Khandhadia et al. | | |
| 2014/0230685 A1 | 8/2014 | Hanano et al. | | |
| 2017/0050609 A1 * | 2/2017 | Yamashita | ............ | B60R 21/261 |
| 2017/0151543 A1 * | 6/2017 | Noda | .................... | B60R 21/264 |

FOREIGN PATENT DOCUMENTS

| | | | | |
|---|---|---|---|---|
| JP | 2010-184559 A | | 8/2010 | |
| JP | 2010-264773 A | | 11/2010 | |
| JP | 2011-157025 A | | 8/2011 | |
| JP | 2014-156207 A | | 8/2014 | |
| JP | 2018012380 A * | | 1/2018 | ........... B60R 21/264 |
| WO | WO 2010/093043 A1 | | 8/2010 | |
| WO | WO 2014/126011 A1 | | 8/2010 | |
| WO | WO 2010/131441 A1 | | 11/2010 | |
| WO | WO 2011/096345 A1 | | 8/2011 | |

* cited by examiner

GAS GENERATOR

TECHNICAL FIELD

The present invention relates to a gas generator used for an airbag apparatus of an automobile or the like.

DESCRIPTION OF RELATED ART

Gas generators, in which a gas generating agent is a gas generating source, are widely used in airbag apparatuses of automobiles or the like.

In some cases, a combustion residue, which includes a mist of a metal in a molten state derived from a component of the gas generating agent, is generated in a combustion gas produced by combustion of the gas generating agent.

If such a combustion residue is directly discharged from the gas generator and enters an airbag, the airbag can be damaged. For this reason, a filter is usually disposed in a gas discharge path (that is, a flow path for the combustion gas) leading the high-temperature combustion gas generated in the gas generator to a gas discharge port to be discharged. The high-temperature combustion gas is cooled and the combustion residue is collected therefrom when the gas passes through the filter, and the gas is then discharged from the gas discharge port into the airbag.

There are also gas generators that do not actively use a filter and have means for collecting combustion residue, alternative to the filter.

In the gas generator disclosed in JP-A No. 2011-157025, it is described that use of a filter is not essential, and when the filter is used, it is attached to the gas discharge path (paragraph number 0029), and that mist is collected in a pocket portion 36 (paragraph number 0042).

The gas generator disclosed in U.S. Pat. No. 8,376,400 has a structure partly similar to that of the gas generator depicted in FIG. 1 of JP-A 2011-157025. A filter is not essential, as with the gas generator described in JP-A 2011-157025, but it is described that "If desired, a filter may be positioned within central baffle chamber 42 or otherwise along a flow path of gases between the inner housing chamber 15d and the housing gas exit aperture 13", and it is also described that the filter can be disposed in a discharge path of gases in the same manner as described in paragraph number 0029 of JP-A 2011-157025.

Further, it is described that in the gas generator depicted in FIG. 1 of JP-A 2010-184559, mist can be collected in a pocket portion 36 (paragraph number 0049) in the same manner as in the gas generator depicted in FIG. 1 of JP-A 2011-157025. It is also described that in the gas generator depicted in FIG. 1 of JP-A No. 2010-264773, mist can be collected in a cylindrical gap (pocket) 36 (paragraph number 0045) in the same manner as depicted in FIG. 1 of JP-A 2011-157025. It is also described that in the gas generator depicted in FIG. 1 of No. 2014-156207, mist can be collected by a pocket portion 36 (paragraph number 0037) in the same manner as depicted in FIG. 1 of No. 2011-157025.

SUMMARY OF INVENTION

The Invention 1 of the present invention provides a gas generator including a cylindrical housing in which an ignition device is attached at a first end portion thereof and a diffuser portion provided with a gas discharge port is attached at a second end portion thereof, an annular end surface, which is in contact with an inner wall surface of the cylindrical housing, being formed between the second end portion of the cylindrical housing and the diffuser portion, a cylindrical flow path forming member being disposed in the cylindrical housing and extending from the side of the first end portion toward the second end portion, an inner space of the cylindrical flow path forming member being partitioned by a partition wall into a first chamber on the side of the first end portion and a second chamber on the side of the second end portion, a space, which includes the first chamber in the cylindrical flow path forming member, being a combustion chamber filled with a gas generating agent, and the second chamber in the cylindrical flow path forming member forming part of a gas discharge path for a combustion gas generated by combustion of the gas generating agent to enter the diffuser portion, in the cylindrical flow path forming member, an upstream end portion being positioned on the side of the first end portion of the cylindrical housing, a downstream end portion being positioned on the side of the second end portion of the cylindrical housing, and the downstream end portion being abutted against the annular end surface, a first cylindrical space being formed between a first wall surface of the cylindrical flow path forming member on the side of the first chamber and the inner wall surface of the cylindrical housing, a second cylindrical space being formed between a second wall surface of the cylindrical flow path forming member on the side of the second chamber and the inner wall surface of the cylindrical housing, and the first cylindrical space and the second cylindrical space being arranged to form a space continuous in an axial direction, and a plurality of first communication holes being formed in the first wall surface on the side of the first chamber and a plurality of second communication holes being formed in the second wall surface on the side of the second chamber, the second cylindrical space being a cylindrical space with a length L from a boundary with the first cylindrical space to the annular end surface, and having an annular pocket portion with a length L1 from the annular end surface to the second communication holes, and at least part of an inner circumferential surface of the annular pocket portion being provided with a concave-convex portion as means for collecting a combustion residue included in the combustion gas generated by combustion of the gas generating agent.

The Invention 2 of the present invention provides a gas generator including a cylindrical housing in which an ignition device is attached at a first end portion thereof and a diffuser portion provided with a gas discharge port is attached at a second end portion thereof, an annular end surface, which is in contact with an inner wall surface of the cylindrical housing, being formed between the second end portion of the cylindrical housing and the diffuser portion, a cylindrical flow path forming member being disposed in the cylindrical housing and extending from the side of the first end portion toward the second end portion, an inner space of the cylindrical flow path forming member being partitioned by a partition wall into a first chamber on the side of the first end portion and a second chamber on the side of the second end portion, a space which includes the first chamber in the cylindrical flow path forming member, being a combustion chamber filled with a gas generating agent, and the second chamber in the cylindrical flow path forming member forming part of a gas discharge path for a combustion gas generated by combustion of the gas generating agent to enter the diffuser portion, in the cylindrical flow path forming member, an upstream end portion being positioned on the side of the first end portion of the cylindrical housing, a downstream end portion being positioned on the side of the second end portion of the cylindrical housing, and the downstream end portion being abutted against the annular end surface, a first cylindrical space being formed between a first wall surface of the cylindrical flow path forming member on the side of the first chamber and the inner wall surface of the cylindrical housing, a second cylindrical space being formed between a second wall surface of the cylindrical flow path forming member on the side of the second chamber and the inner wall surface of the cylindrical housing, and the first cylindrical space and the second cylindrical space being arranged to form a space continuous in an axial direction, and a plurality of first communication holes being formed in the first wall surface on the side of the first chamber and a plurality of second communication holes being formed in the second wall surface on the side of the second chamber, the second cylindrical space being a cylindrical space with a length L from a boundary with the first cylindrical space to the annular end surface, and having an annular pocket portion with a length L1 from the annular end surface to the second communication holes, and an annular filter being disposed in the annular pocket portion as means for collecting a combustion residue included in the combustion gas generated by combustion of the gas generating agent.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

The present invention provides a gas generator in which an advantageous effect of collecting a combustion residue in a combustion gas generated by combustion of a gas generating agent is enhanced.

The gas generator of the present invention has a annular pocket portion as means for collecting a combustion residue (including mist) generated by combustion of a gas generating agent. By contrast with the gas generators of the inventions disclosed in JP-A No. 2011-157025, U.S. Pat. No. 8,376,400, JP-A No. 2010-184559, JP-A No. 2010-264773 and JP-A No. 2014-156207, the gas generator of the present invention uses the pocket portion in which at least a part of its inner circumferential surface has the concave-convex portion.

Further, in the gas generator of the present invention, a filter, which is disposed in a gas discharge path for the gas flow of the combustion gas passing through from the upstream side to the downstream side (that is, the gas flows only in one direction), is not used as means for collecting the combustion residue (including mist) generated by combustion of the gas generating agent.

The annular end surface which is in contact with the inner wall surface of the cylindrical housing is formed between an opening at the second end portion of the cylindrical housing and the diffuser portion.

The annular end surface is formed, for example, in the following manner:

(i) A configuration in which a cup-shaped diffuser portion having a flange at the opening is used, and the flange of the diffuser portion is fitted into the opening at the second end portion of the cylindrical housing and then fixed by welding. In this configuration, the flange of the diffuser portion corresponds to the annular end surface; and (ii) A configuration in which a flange extending inwardly is formed at the opening of the second end portion of the cylindrical housing, and the opening of the cup-shaped diffuser portion is fixed by welding to the flange. In this configuration, the inwardly extending flange corresponds to the annular end surface.

In the cylindrical housing, the first end portion is on the side of the ignition device and the second end portion is on the side of diffuser portion.

In the cylindrical flow path forming member disposed in the cylindrical housing, an upstream end portion is on the side of the first end portion of the cylindrical housing, a downstream end portion is on the side of the second end portion of the cylindrical housing, and the inner space is partitioned by a partition wall into two chambers, namely, a first chamber on the side of the first end portion and a second chamber on the side of the second end portion. Here, the upstream and the downstream indicate directions in which the combustion gas flows during actuation.

The space including the first chamber is a combustion chamber filled with a gas generating agent.

The second chamber forms part of a gas discharge path for the combustion gas generated by combustion of the gas generating agent to enter the diffuser portion.

The upstream end portion of the cylindrical flow path forming member is positioned on the side of the first end portion of the cylindrical housing, the downstream end portion is positioned on the side of the second end portion of the cylindrical housing, and the downstream end portion is abutted against the annular end surface of the configuration (i) or (ii) described above.

A first cylindrical space is formed between the first wall surface on the side of the first chamber and the inner wall surface of the cylindrical housing.

A second cylindrical space is formed between the second wall surface on the side of the second chamber and the inner wall surface of the cylindrical housing.

The first cylindrical space and the second cylindrical space are arranged so as to form a space continuous in the axial direction.

The cylindrical flow path forming member, in which the inside is partitioned into the first chamber and the second chamber by the partition wall, can be formed in the following configurations.

(I) A configuration in which a cylindrical member and a cup member are combined in such a manner that the downstream end portion of the cylindrical member has a surface having one or two or more holes or recesses, the bottom surface of the cup member has one or two or more protrusions corresponding to the holes or recesses, and the holes or recesses are fitted to the protrusions. In this configuration, a cylindrical flow path forming member is formed by the combination of the cylindrical member and cup member, the bottom surface of the cup member serves as the partition wall, the first chamber is on the side of the cylindrical member side, and the second chamber is on the side of the cup member.

(II) A configuration in which a cylindrical member and a cup member are combined in such a manner that a downstream end portion of the cylindrical member has a protrusion, a hole or a recess to fit the protrusion is formed on the bottom surface of the cup member, and the hole or the recess and the protrusion are fitted together. In this configuration, a cylindrical flow path forming member is formed by the combination of the cylindrical member and cup member, the bottom surface of the cup member serves as the partition wall, the first chamber is on the side of the cylindrical member, and the second chamber is on the side of the cup member.

(III) A configuration in which a cylindrical member and a cup member are combined in such a manner that an opening at the downstream end portion of the cylindrical member is fitted in an annular groove formed in the bottom surface of the cup member. In this configuration, a cylindrical flow path forming member is formed by the combination of the cylindrical member and cup member, the bottom surface of the cup member serves as the partition wall, the first chamber is on the side of the cylindrical member, and the second chamber is on the side of the cup member.

(IV) A configuration in which a cylindrical member and a cup member are combined in such a manner that an opening at the upstream end portion of the cylindrical member is fitted in an annular groove formed in the bottom surface of the cup member. In this configuration, a cylindrical flow path forming member is formed by the combination of the cylindrical member and the cup member and the bottom surface of the cup member serves as the partition wall, but by contrast with the configuration (III), the first chamber is on the side of the cup member and the second chamber is on the side of the cylindrical member.

(V) A configuration in which the first chamber and the second chamber are formed by partitioning the inside of a single cylindrical member with a partition wall of a separate member. In this case, the partition wall is fixed by welding from the outside after positioning, for example, with a positioning protrusion formed in advance inside the cylindrical member.

An example of the upstream end portion of the cylindrical flow path forming member can include a configuration in which the flange formed at the opening is abutted against and supported by the inner wall surface of the housing, and a configuration in which an enlarged diameter portion is formed and the outer circumferential surface of the enlarged diameter portion is abutted against and supported by the inner wall surface of the housing.

The annular pocket portion corresponds to a portion of a range with a length L1 from the annular end surface to the second communication hole, in a range (length L) from a boundary between the first cylindrical space and the second cylindrical space to the annular end surface. The annular pocket portion does not include the second communication hole.

The annular pocket portion is a space in which the combustion gas stays only while flowing into the annular pocket portion, colliding with the annular end surface (the direction of the gas changes in the second cylindrical space) and flowing out. The annular pocket portion is not a gas discharge path through which the combustion gas flow passes from the upstream side to the downstream side.

In the Invention 1 of the present invention, at least part of the inner circumferential surface of the annular pocket portion is provided with the concave-convex portion as means for collecting a combustion residue generated by combustion of the gas generating agent.

Because such a concave-convex portion is provided, the contact area with the combustion residue included in the combustion gas is increased, so that the advantageous effect of collecting the combustion residue is enhanced.

In the gas generator of the Invention 1 of the present invention, the concave-convex portion for collecting the combustion residue generated by combustion of the gas generating agent is preferably formed in the range of L1 on an outer circumferential surface of the second wall surface on the side of the second chamber.

The concave-convex portion can be formed on the inner wall surface of the cylindrical housing which radially faces the outer circumferential surface of the second wall surface on the side of the second chamber. However, from the standpoint of imparting necessary pressure resistance and durability to the cylindrical housing, it is preferable to form the concave-convex portion on the outer circumferential surface of the second wall surface on the side of the second chamber. It is also possible to form the concave-convex portion on the annular end surface.

Since the concave-convex portion is sufficiently small as compared with a size (a space volume) of the annular pocket portion, the space volume of the annular pocket portion is not substantially reduced.

In the gas generator of the Invention 1 of the present invention, it is preferable that the concave-convex portion, for collecting the combustion residue generated by combustion of the gas generating agent, includes concave portions (annular grooves) continuously formed in the circumferential direction and convex portions (annular protrusions between the adjacent annular grooves) continuously formed in the circumferential direction, and the concave portions and the convex portions are arranged alternately in the axial direction in the range of L1 on an outer circumferential surface of the second wall surface on the side of the second chamber.

It is also acceptable that spiral concavities and convexities are formed by forming a spiral groove on the outer circumferential surface of the cup member.

A regular concave-convex portion is easy to process, and stable effect of collecting the combustion residue is obtained.

In the gas generator of the Invention 1 of the present invention, it is preferable that the concave-convex portion for collecting the combustion residue generated by combustion of the gas generating agent includes concave portions continuously formed in the circumferential direction and convex portions continuously formed in the circumferential direction, the concave portions and the convex portions are arranged alternately in the axial direction in the range of L1 on an outer circumferential surface of the second wall surface on the side of the second chamber, and the convex portions are inclined toward the annular end surface.

Where the convex portions are inclined toward the annular end surface, since the concave portions are also inclined toward the annular end surface side, when the combustion residue enters the concave portions, it is unlikely to come out of the concave portions. Therefore, an advantageous effect of collecting the combustion residue is enhanced.

The concave-convex portion may be formed by roughening the surface by a method such as sandblasting or chemical etching.

In the gas generator of the Invention 1 of the present invention, it is preferable that in the concave-convex portion for collecting the combustion residue generated by combustion of the gas generating agent, a height difference between the concave portion and the convex portion is within a range of 0.2 mm to 2 mm.

Preferably, when the height difference between the concave portion and the convex portion is within the above range, the advantageous effect of collecting the combustion residue in the combustion gas is enhanced.

In the gas generator of the Invention 1 of the present invention, a contact area with the combustion gas is increased by forming the concave-convex portion in the annular pocket portion. Therefore, when the combustion gas enters the annular pocket portion, the advantageous effect of collecting the combustion residue included in the combustion gas is enhanced.

By contrast, the gas generators described in JP-A No. 2011-157025, U.S. Pat. No. 8,376,400, JP-A No. 2010-184559, JP-A No. 2010-264773 and JP-A No. 2014-156207 also have a similar pocket portion, but since there is no concave-convex portion on a surface, when the same gas generating agent is used, the effect of collecting the combustion residue is less.

An aspect of the gas generator of the Invention 2 of the present invention is that an annular filter is disposed inside the annular pocket portion as means for collecting the combustion residue generated by combustion of the gas generating agent. Apart from the above, the gas generator is the same as the gas generator having the concave-convex portion as means for collecting the combustion residue.

The annular pocket portion is a space in which the combustion gas stays only while flowing into the annular pocket portion, colliding with the annular end surface (the direction of the gas changes in the second cylindrical space) and flowing out. The annular pocket portion is not a gas discharge path through which the combustion gas flow passes from the upstream side to the downstream side.

The annular filter only have to be disposed inside the annular pocket portion, but the annular filter is disposed not to be in contact with the second communication hole, because the second communication hole is not included in the annular pocket portion.

In order to prevent the annular filter from moving in the axial direction, it is preferable that a protrusion having a stopper function is formed on either or both of the outer circumferential surface of the second wall surface on the side of the second chamber and the inner wall surface of the cylindrical housing and that the annular filter is disposed to be held between the protrusion and the annular end surface.

In the gas generator of the Invention 2 of the present invention, it is preferable that the annular filter is disposed such that at least the inner circumferential surface thereof is abutted against an outer circumferential surface of the second wall surface on the side of the second chamber and that the annular filter occupies part of a space of the annular pocket portion.

The annular filter is preferably disposed to occupy only part of the annular pocket portion, rather than the entire annular pocket portion. By arranging in this way, even when the annular filter is disposed, the annular space remains, so that the combustion gas easily enters and leaves and the advantageous effect of collecting the combustion residue is enhanced.

Further, the annular filter can be disposed to abut against the inner wall surface of the cylindrical housing in the annular pocket portion, or to abut against three surfaces, namely, the outer circumferential surface of the second wall surface on the side of the second chamber, the annular end surface and the inner wall surface of the cylindrical housing in the annular pocket portion.

In the gas generator of the Invention 2 of the present invention, it is preferable that the annular filter preferably has a bulk density of 1 to 3 $g/cm^3$.

Preferably, when the bulk density is within the above range, the advantageous effect of collecting the combustion residue including mist is enhanced.

In the gas generator of the Invention 2 of the present invention, a contact area with the combustion gas is increased by a filter disposed in the annular pocket portion. Therefore, when the combustion gas enters the annular pocket portion, the advantageous effect of collecting the combustion residue included in the combustion gas is enhanced.

By contrast, the gas generators described in JP-A No. 2011-157025, U.S. Pat. No. 8,376,400, JP-A No. 2010-184559, JP-A No. 2010-264773 and JP-A No. 2014-156207 also have a similar pocket portion, but since no filter is disposed therein, the effect of collecting the combustion residue is less.

The gas generator of the present invention includes a concave-convex portion or an annular filter in the annular pocket portion as means for collecting the combustion residue included in the combustion gas generated by combustion of the gas generating agent.

Therefore, since a contact area with the combustion gas generated by combustion of the gas generating agent is increased, the advantageous effect of collecting the combustion residue included in the combustion gas is enhanced.

The gas generator of the present invention can also be applied as an improved gas generators of those described in JP-A No. 2011-157025, U.S. Pat. No. 8,376,400, JP-A No. 2010-184559, JP-A No. 2010-264773 and JP-A No. 2014-156207.

The gas generator of the present invention is usable as a gas generator for an airbag apparatus of an automobile.

Figure 1:
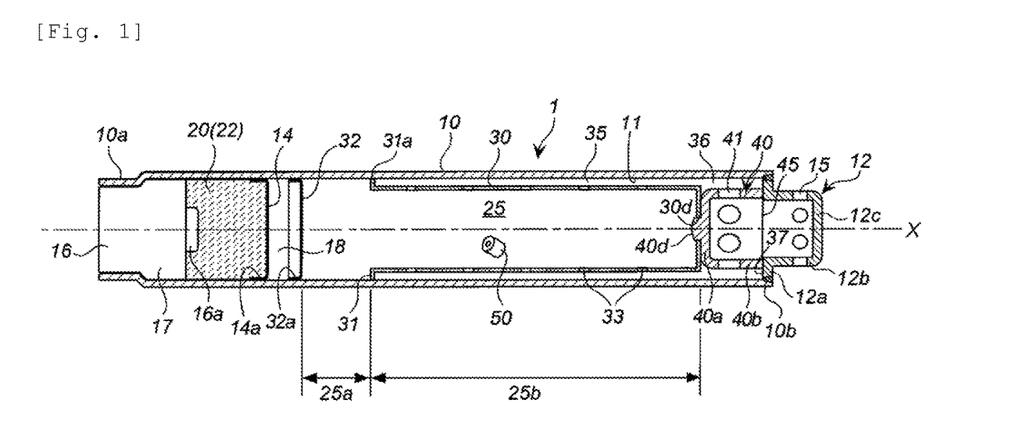
FIG. 1 shows a cross-sectional view in the axial direction of a gas generator of the present invention.
Figure 2:
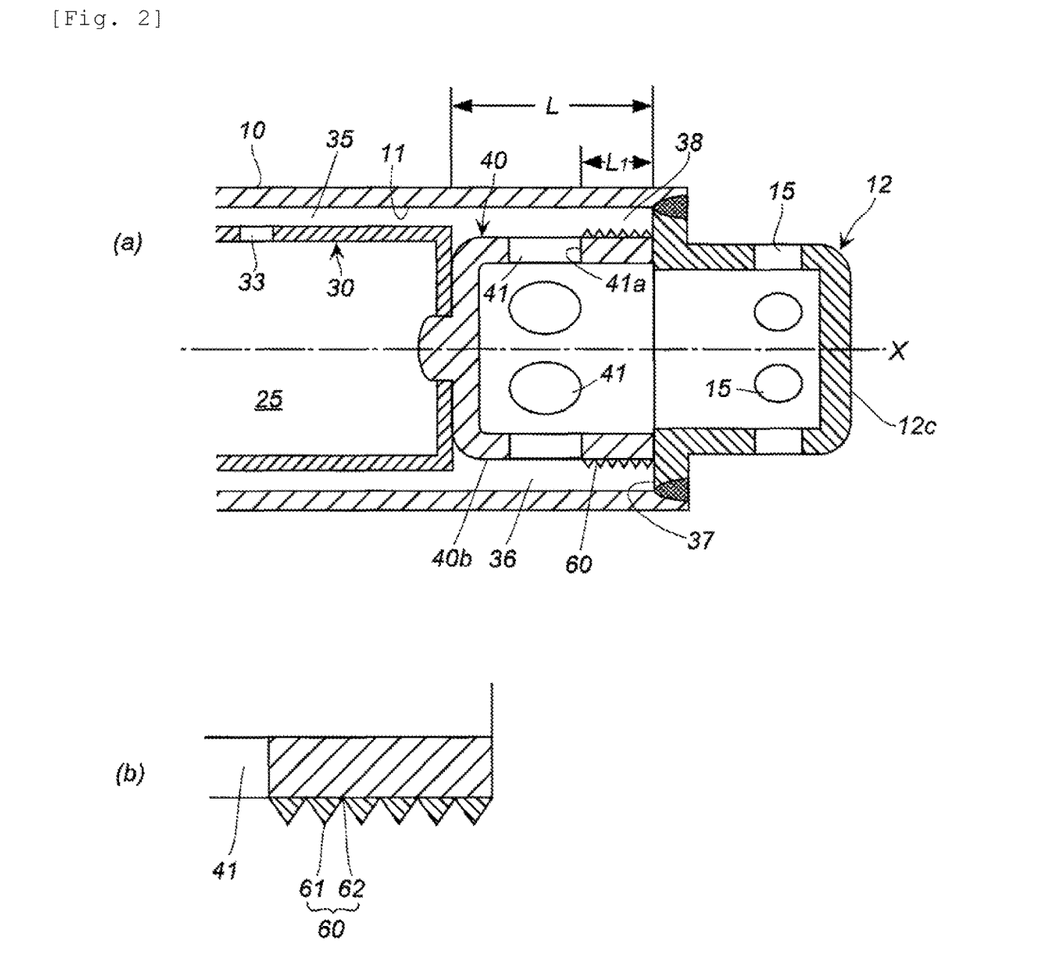
FIG. 2 shows, in (a), a partial cross-sectional view of a configuration in which the gas generator depicted in FIG. 1 has a concave-convex portion in a pocket portion as means for collecting a combustion residue in a combustion gas, and in (b), a partially enlarged view of (a)
Figure 3:
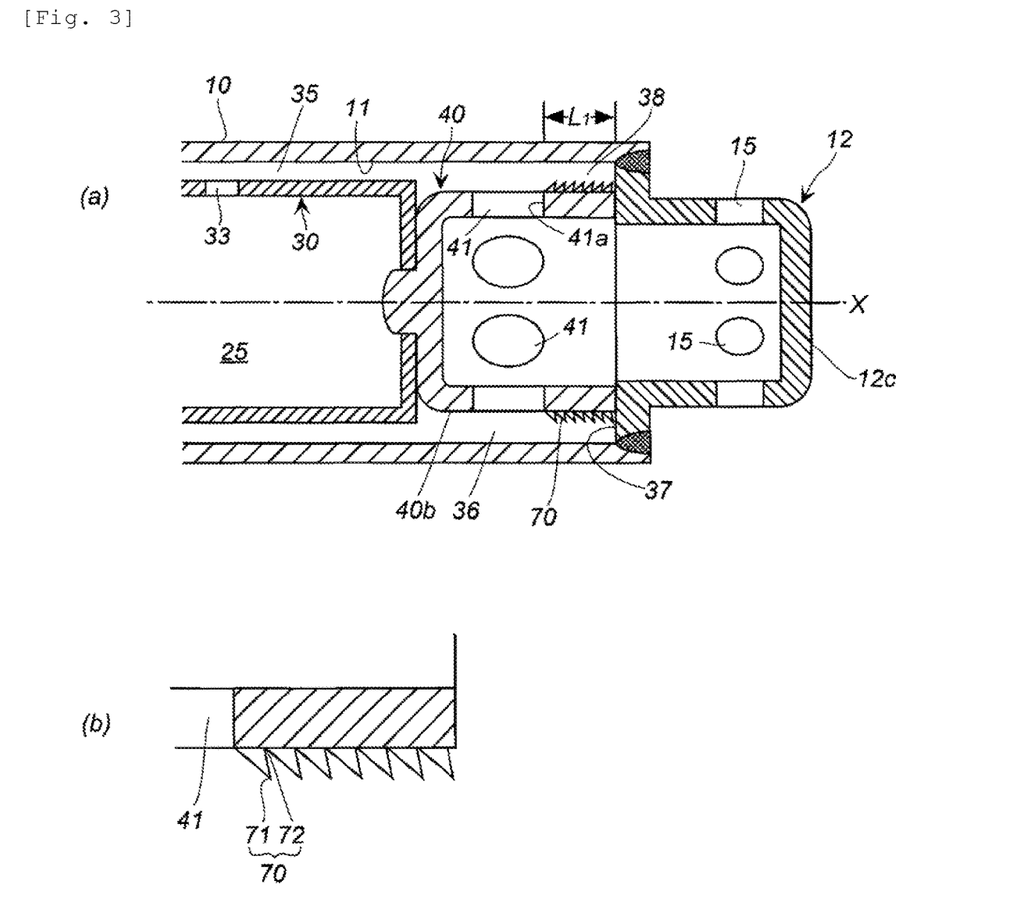
FIG. 3 shows, in (a), a partial cross-sectional view of a gas generator different from that depicted in FIG. 2, and in (b), a partially enlarged view of (a)

Description of Embodiments (1) Gas Generator Depicted in FIGS. 1 to 3

Explained hereinbelow is an embodiment in which a concave-convex portion depicted in FIG. 2 or FIG. 3 is used in a gas generator 1 depicted in FIG. 1 as means for collecting a combustion residue.

The gas generator 1 depicted in FIG. 1 is the same as the gas generator depicted in FIG. 1 of JP-A No. 2011-157025, except that it has means for collecting a combustion residue generated by combustion of a gas generating agent, which is an aspect of the present invention.

An igniter 16 serving as an ignition device is mounted at a first end portion 10a of a cylindrical housing 10. The igniter 16 is a known electric igniter fixed to a collar 17, and an ignition portion 16a thereof including an ignition agent protrudes from the collar 17.

A diffuser portion 12 is attached to a second end portion 10b which is the opposite end of the cylindrical housing 10.

The diffuser portion 12 is in a substantially cup shape including a flange 12a, a circumferential wall 12b and a bottom 12c, and is welded and fixed to the cylindrical housing 10 at the flange 12a. Incidentally, the diffuser portion 12 and the cylindrical housing 10 may be formed integrally.

An annular end surface 37, which in contact with the inner wall surface 11, is obtained by the flange 12a of the diffuser portion 12 at the second end portion 10b of the cylindrical housing 10.

A plurality of gas discharge ports 15 are formed in the circumferential wall 12b.

On the side of igniter 16 in the cylindrical housing 10, a first porous plate member 14 is disposed at a distance from the igniter 16. The first porous plate member 14 has an annular wall 14a formed on the circumferential edge of a circular bottom surface. The first porous plate member is fixed by the annular wall 14a which is in press-contact with the inner wall surface 11 of the cylindrical housing 10.

A space surrounded by the igniter 16 (the igniter 16 and the collar 17), the cylindrical housing 10 and the first porous plate member 14 is a first combustion chamber 20. The first combustion chamber 20 is filled with a first gas generating agent 22.

The first gas generating agent 22 is in contact with the ignition portion 16a of the igniter 16. A through hole (not depicted in the drawing) of the first porous plate member 14 is an opening smaller than the first gas generating agent 22. The through hole may be closed with a seal tape.

The first gas generating agent 22 can be a gas generating agent having good ignitability and sustaining combustion (a high combustion temperature). The combustion temperature of the first gas generating agent 22 is preferably in a range of 1700° C. to 3000° C.

An example of the first gas generating agent can be a disc-shaped agent having an outer diameter of 1.5 mm and a thickness of 1.5 mm and including nitroguanidine (34 wt %) and strontium nitrate (56 wt %).

The first gas generating agent 22 is held in a state of being pressed toward the igniter 16 by the first porous plate member 14.

In the present embodiment, a cylindrical flow path forming member is formed by a combination of a cylindrical member 30 and a cup member 40, a bottom surface 40a of the cup member 40 serves as a partition wall, the internal space of the cylindrical member 30 is a first chamber, and the internal space of the cup member 40 is a second chamber.

The cup member 40 is disposed at an end portion (a second end portion 10b) on the side of the diffuser portion 12 in the cylindrical housing 10.

The cup member 40 has the bottom surface (the partition wall) 40a and a circumferential wall (a second wall surface) 40b, and the circumferential wall (the second wall surface) 40b has a plurality of second communication holes 41. A protrusion 40d is formed at the center of the bottom surface 40a so as to extend toward the igniter 16.

The cup member 40 is fixed to the flange 12a (the annular end surface 37) of the diffuser portion 12 by a known method (welding or the like).

An opening of the cup member 40 is closed with a seal tape 45 to block moisture entering from the gas discharge port 15.

The internal space (the second chamber) of the cup member 40 forms part of the gas discharge path for the combustion gas generated by combustion of the gas generating agent to enter the diffuser portion 12.

An outer diameter of the cup member 40 is smaller than an inner diameter of the cylindrical housing 10. Therefore, a second cylindrical space 36 is present between the circumferential wall (the second wall surface) 40b and the inner wall surface 11 of the cylindrical housing 10.

As depicted in (a) in FIG. 2, the second cylindrical space 36 is a cylindrical space with a length L from the boundary with a first cylindrical space 35 to the annular end surface 37.

In the second cylindrical space 36 with a length L, a portion with a length L1 from the annular end surface 37 to the second communication holes 41 (to an inner circumferential surface 41a, on the side of the annular end surface 37, of the second communication hole 41) corresponds to a dead-end annular pocket portion 38 surrounded by the inner wall surface 11 of the cylindrical housing 10, the annular end surface 37 and the circumferential wall 40b of the cup member 40.

In the second cylindrical space 36, a portion with a length obtained by subtracting the length L1 from the length L serves as a gas discharge path for passage of the combustion gas. Since the combustion gas does not pass unidirectionally through the annular pocket portion 38 of the length L1, the pocket portion is not included in the gas discharge path.

The cylindrical member 30 is also disposed in the cylindrical housing 10. The cylindrical member 30 has an outer diameter smaller than the inner diameter of the cylindrical housing 10, and the first cylindrical space 35 having a uniform width is formed between the cylindrical member 30 and the cylindrical housing 10.

In the cylindrical member 30, a circumferential wall (a first wall surface) is provided with a plurality of first communication holes 33 serving as gas-passing holes at equal intervals in an axial direction. The first communication holes 33 are formed at equal intervals in a circumferential direction of the cylindrical member 30.

The second combustion chamber (the first chamber) 25 and the first cylindrical space 35 communicate with each other through the plurality of first communication holes 33. The first communication holes 33 may be formed disproportionally, only in the circumferential wall on the side of the diffuser portion 12. Further, the opening area thereof may be increased toward the diffuser portion 12.

The cylindrical member 30 has an enlarged diameter portion 31 in a flange shape on the side of the igniter 16 (at an upstream end portion), and an outer circumferential edge 31a of the enlarged diameter portion 31 is abutted against the inner wall surface 11 of the cylindrical housing 10.

The outer diameter of the outer circumferential edge 31a is slightly larger than the inner diameter of the cylindrical housing 10, and when the cylindrical member 30 is disposed in the cylindrical housing 10, the outer circumferential edge is in press-contact with the inner wall surface 11 of the cylindrical housing 10 by elasticity of the enlarged diameter portion 31. Therefore, no gap is formed in the press-contact section.

In order to fix the cylindrical member 30, a stepped portion to be fitted to, or a protrusion to be engaged with the circumferential edge of the opening of the enlarged diameter portion 31 may be formed in the cylindrical housing 10.

In the cylindrical member 30, a central hole 30d is formed in the center of the bottom surface on the side of the diffuser portion 12 (at a downstream end portion). The central hole 30d is fitted onto a protrusion 40d formed in the bottom surface 40a of the cup member 40.

Since the enlarged diameter portion 31 of the cylindrical member 30 is in press-contact with the inner wall surface of the cylindrical housing 10 and the central hole 30d is fitted onto a protrusion 40d of the cup member 40, the cylindrical member 30 is fixed in both the axial direction and the radial direction and arranged coaxially (on the axis X) with the cylindrical housing 10.

A second porous plate member 32 is disposed between the cylindrical member 30 and the first porous plate member 14. In the second porous plate member 32, an annular wall 32a is formed on a circumferential edge of a circular bottom surface, and the annular wall 32a is in press-contact with the inner wall surface of the cylindrical housing 10, thereby fixing the second porous plate member. A space 18 is formed between the second porous plate member 32 and the first porous plate member 14. The annular wall 32a extends toward the igniter 16.

The second combustion chamber 25 is surrounded by the second porous plate member 32, the cylindrical member 30 and the cylindrical housing 10. The second combustion chamber 25 is filled with a second gas generating agent 50.

A through hole (not depicted in the drawing) of the second porous plate member 32 is an opening smaller than the second gas generating agent 50. The through hole may be closed with a seal tape.

The second combustion chamber 25 includes a space 25a from the enlarged diameter portion 31 of the cylindrical member 30 to the second porous plate member 32 and the remaining space 25b, and forms a single combustion chamber as a whole. The inner diameter of the space 25a is larger than that of the space 25b.

The second gas generating agent 50 uses a gas generating agent having a combustion temperature lower than that of the first gas generating agent 22. The combustion temperature of the second gas generating agent 50 is preferably in a range of 1000° C. to 1700° C. An example of the second gas generating agent 50 can be a single-perforated columnar agent having an outer diameter of 1.8 mm, an inner diameter of 0.7 mm and a length of 1.9 mm and including guanidine nitrate (41 wt %), basic copper nitrate (49 wt %) and a binder and an additive.

The second gas generating agent 50 is held in a state of being pressed toward the diffuser portion 12 by the second porous plate member 32. Therefore, the second gas generating agent 50 in the second combustion chamber 25 is densely filled and prevented from moving and forming a gap.

The gas generator 1 depicted in FIG. 1 has a concave-convex portion 60 in the annular pocket portion 38.

As depicted in (a) in FIG. 2, the concave-convex portion 60 is formed on the circumferential wall 40b of the cup member 40.

In the concave-convex portion 60, as depicted in (b) in FIG. 2, concave portions 62 continuously formed in the circumferential direction and convex portions 61 continuously formed in the circumferential direction are arranged alternately in the direction of the axis X. A height difference between the concave portion and the convex portion (a height difference based on the surface of the circumferential wall 40b) is about 1 mm.

When the combustion gas enters the annular pocket portion 38, a contact area with the combustion gas is increased because the concave-convex portion 60 is formed. As a result, an advantageous effect of collecting the combustion residue in the combustion gas is enhanced.

In the gas generator 1 depicted in FIG. 1, a concave-convex portion 70 such as depicted in (a) in FIG. 3 can be formed instead of the concave-convex portion 60 in the annular pocket portion 38.

In the concave-convex portion 70, as depicted in (b) in FIG. 3, concave portions 72 continuously formed in the circumferential direction and convex portions 71 continuously formed in the circumferential direction are arranged alternately in the direction of the axis X, and the convex portions 71 are inclined toward the annular end surface 37. A height difference between the concave portion and the convex portion (a height difference based on the surface of the circumferential wall 40b) is about 1 mm.

When the combustion gas enters the annular pocket portion 38, a contact area with the combustion gas is increased because the concave-convex portion 70 is formed. As a result, the advantageous effect of collecting the combustion residue in the combustion gas is enhanced.

Furthermore, since the convex portions 71 are inclined toward the annular end surface 37, the advantageous effect of collecting the combustion residue is further enhanced.

Next, an operation of the gas generator 1 in FIG. 1, which includes the concave-convex portion 60 depicted in FIG. 2, will be described.

When the first gas generating agent 22 in the first combustion chamber 20 is burned by actuation of the igniter 16, a combustion product (flame or high-temperature gas) is generated therefrom, passes through the through holes of the first porous plate member 14, and enters the space 18.

The combustion product passes from the space 18 through the through hole of the second plate member 32 and ignites the second gas generating agent 50 present in the second combustion chamber 25. At this time, the second gas generating agent 50 present in the space 25a is ignited first and combustion gas is generated.

Since the combustion product generated from the first combustion chamber 20 enters the space 18 once, the second gas generating agent 50 adjacent to the second porous plate member 32 (the gas generating agent 50 in the space 25) starts burning from the entire end surface. Therefore, patchy ignition is unlikely to occur.

When the combustion gas generated by combustion of the second gas generating agent 50 in the space 25a enters the space 25b, the gas flow is accelerated by the enlarged diameter portion 31. Further, since the enlarged diameter portion 31 and the inner wall surface of the cylindrical housing 10 are in press-contact with each other, the combustion gas does not flow from the press-contact section into the first cylindrical space 35.

The combustion gas flows out from the first communication holes 33 into the first cylindrical space 35, collides with the inner wall surface 11 of the cylindrical housing 10 and flows in the direction toward the diffuser portion 12. In this process, part of the combustion residue included in the combustion gas adheres to the inner wall surface 11 of the cylindrical housing 10.

Further, the combustion gas still including the combustion residue moves from the first cylindrical space 35 into the second cylindrical space 36, enters the annular pocket portion 38, then changes the direction thereof by colliding with the annular end surface 37, enters from the second communication holes 41 into the cup member 40, and breaks the seal tape 45.

The combustion gas then further changes the direction thereof by colliding with the bottom 12c of the diffuser portion 12 and is discharged from the gas discharge port 15.

When the combustion gas enters the annular pocket portion 38, the combustion gas comes into contact with the concave-convex portion 60, so that most of the combustion residue in the combustion gas is collected in the concave-convex portion 60, and further part of the combustion residue is collected at the inner surface of the annular pocket portion 38 where the concave-convex portion 60 is not present.

The annular pocket portion 38 is a space in which the combustion gas temporarily stays and the direction of the gas flowing in the cylindrical space is changed, rather than a space through which the combustion gas flow passes from the upstream side to the downstream side. For this reason, the annular pocket portion is unlikely to be affected by the combustion gas flow, and therefore, the combustion residue collected in the concave-convex portion 60 is unlikely to scatter and the residue once adhered is unlikely to fall off due to the gas flow. Further, even where an amount of the adhered residue increases, an airflow resistance to gas discharge is not affected and an output performance of the gas generator is stable.

By contrast, when the concave-convex portion 60 is formed in the gas discharge passage through which the combustion gas flow passes from the upstream side to the downstream side, even when the combustion residue is collected by the concave-convex portion 60, the collected combustion residue may be scattered by the subsequent combustion gas flow. Furthermore, since a collected amount of the residue increases and the pressure loss increases with respect to the discharge of the gas, an output performance of the gas generator may change.

(2) Gas Generators Depicted in FIGS. 1 and 4 to 7

Explained hereinbelow are embodiments in which annular filters depicted in FIGS. 4 to 7 are used in the gas generator 1 depicted in FIG. 1 as means for collecting the combustion residue.

Figure 4:
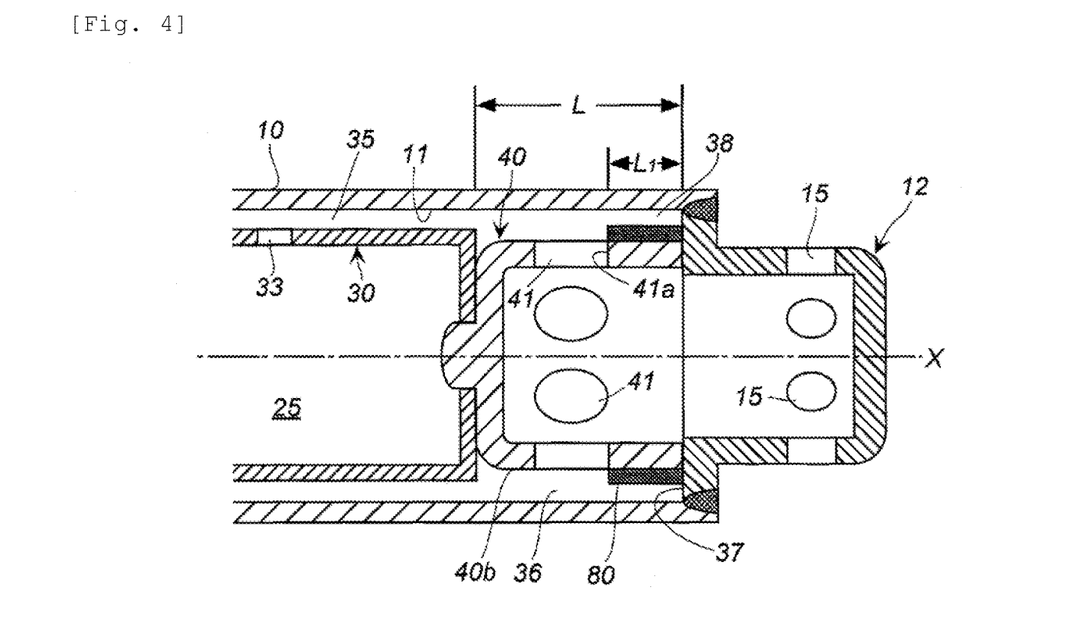
FIG. 4 shows a partial cross-sectional view of a configuration in which the gas generator depicted in FIG. 1 has an annular filter in a pocket portion as means for collecting a combustion residue in a combustion gas.

<Gas generator depicted in FIG. 4>

An annular filter 80 is disposed so that the inner circumferential surface thereof abuts against the circumferential wall 40b of the cup member 40.

The width of the annular filter 80 is about a half of the width of the annular pocket portion 38, and the length of the filter is L1. An annular space excluding the annular filter 80 with ½ width and length L1 is present in the annular pocket portion 38.

The bulk density of the annular filter 80 is about 2 g/cm³.

In the annular filter 80, a size of the inner diameter thereof is adjusted with respect to a size of the outer diameter of the cup member 40, so that the annular filter 80 is press-fitted.

Figure 5:
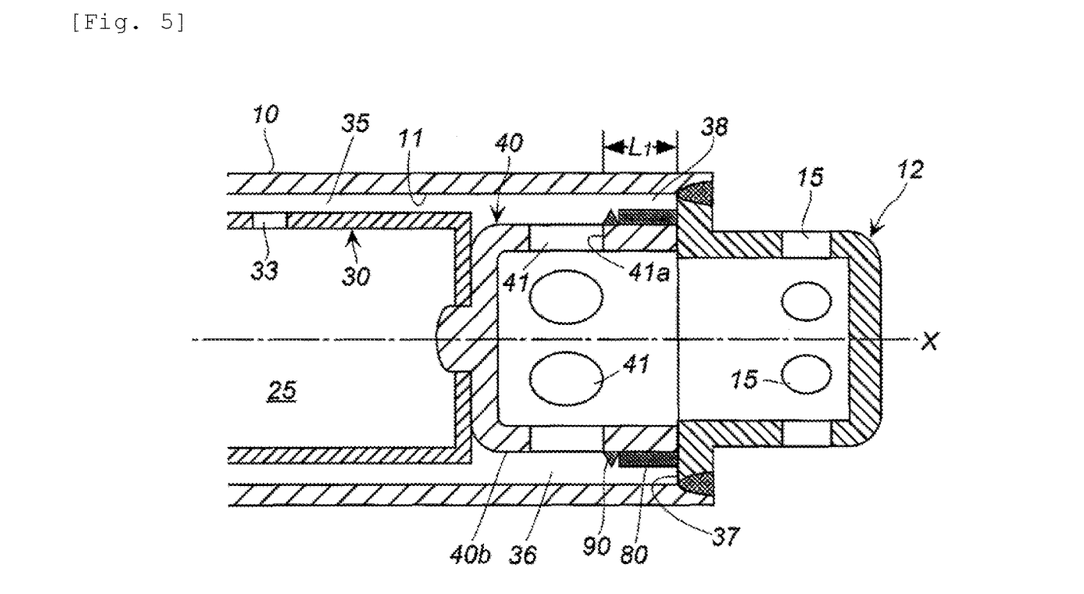
FIG. 5 shows a partial cross-sectional view of a gas generator different from that depicted in FIG. 4.

<Gas Generator Depicted in FIG. 5>

A gas generator is another embodiment of the gas generator depicted in FIG. 4.

An annular protrusion 90 continuous in the circumferential direction is formed at a position in contact with the second communication hole 41 in the circumferential wall 40b of the cup member 40.

The annular filter 80 is fitted between the annular protrusion 90 and the annular end surface 37 so as to be fixed, not to move in the axial direction. The protrusion 90 is formed to fix the annular filter 80 and may be in the form of a plurality of protrusions or an annular step.

Even when the filter is disposed in the pocket portion 38 as described above, since the filter does not occupy the entire space of the pocket portion 38 and a space bare of the annular filter 80 is formed, it is possible to increase a contact area between the combustion residue and the filter 80 and make it difficult for the residue to fall off under the effect of gas flow. As the filter 80, a filter obtained by rolling a known wire mesh several times or by winding a wire can be used.

Figure 6:
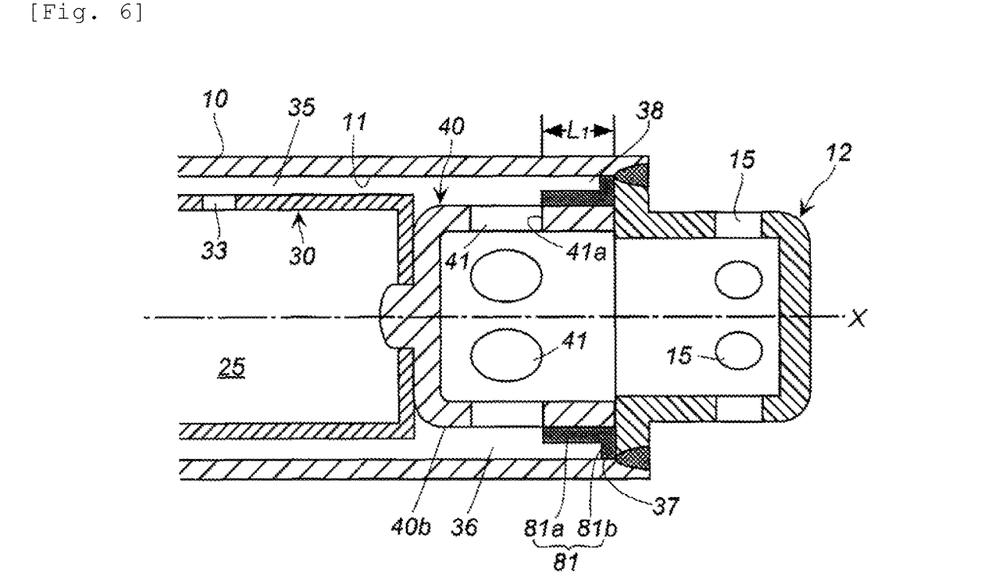
FIG. 6 shows a partial cross-sectional view of a gas generator different from those depicted in FIGS. 4 and 5.

<Gas Generator Depicted in FIG. 6>

An annular filter 81 has a circumferential wall 81a and a flange 81b. The annular filter 81 is disposed such that the inner circumferential surface of the circumferential wall 81a abuts against the circumferential wall 40b of the cup member 40 and the flange 81b abuts against the annular end surface 37.

A thickness of the circumferential wall 81a of the annular filter 81 is about a half of the width of the annular pocket portion 38, and a height of the circumferential wall is L1. An annular space bare of the annular filter 81 is present in the annular pocket portion 38.

The bulk density of the annular filter 81 is about 2 g/cm³.

In the annular filter 81, a size of the inner diameter thereof is adjusted with respect to a size of the outer diameter of the cup member 40 and further, a width of the flange 81b is adjusted with respect to a width of the annular end surface 37, so that the annular filter 81 is press-fitted into the pocket portion 38.

It is also possible to fix the annular filter 81 by using the annular protrusion 90 depicted in FIG. 5.

Figure 7:
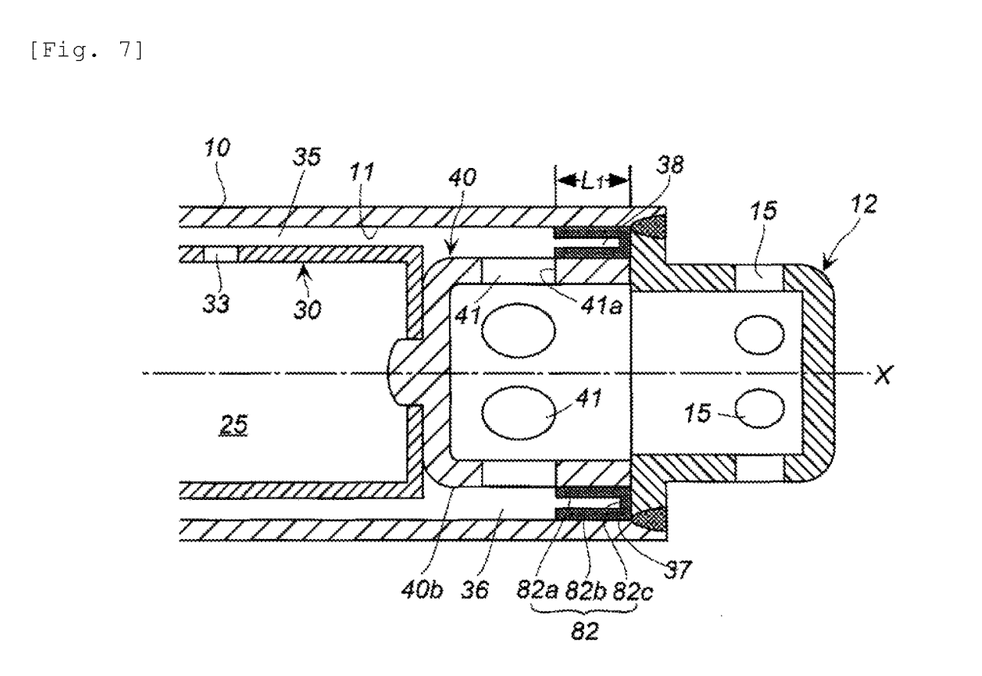
FIG. 7 shows a partial cross-sectional view of a gas generator different from those depicted in FIGS. 4 to 6.

<Gas Generator Depicted in FIG. 7>

An annular filter 82 includes an inner circumferential wall 82a, an outer circumferential wall 82b and an annular bottom surface 82c connecting the inner circumferential wall 82a and the outer circumferential wall 82b.

The annular filter 82 is disposed such that the inner circumferential surface of the inner circumferential wall 82a is abutted against the circumferential wall 40b of the cup member 40, the annular bottom surface 82c is abutted against the annular end surface 37, and the outer circumferential surface of the outer circumferential wall 82b is abutted against the inner wall surface 11 of the cylindrical housing 10.

A total thickness of the inner circumferential wall 82a and the outer circumferential wall 82b of the annular filter 82 is about ⅔ of the width of the annular pocket portion 38, and the height thereof is L1. An annular space bare of the annular filter 82 is present in the annular pocket portion 38.

The annular filter 82 has a bulk density of about 2 g/cm³.

In the annular filter 82, a size of the inner diameter of the inner circumferential wall 82a is adjusted with respect to a size of the outer diameter of the cup member 40, and a width of the annular bottom surface 82c is adjusted with respect to a width of the annular end surface 37 so that the annular filter 82 is press-fitted in the pocket portion 38.

It is also possible to fix the annular filter 82 by using the annular protrusion 90 depicted in FIG. 5.

In the embodiments illustrated by FIGS. 6 and 7, a space occupied by the annular filter 80 is larger than that in the embodiment illustrated by FIGS. 4 and 5, but since the space bare of the annular filter 80 is ensured, the same advantageous effect as in the embodiments illustrated by FIGS. 4 and 5 is obtained.

Next, an operation of the gas generator 1 in FIG. 1, which includes the annular filter 80 depicted in FIG. 4 will be described.

Since a basic operation is the same as that of the gas generator 1 in FIG. 1, which includes the concave-convex portion 60 depicted in FIG. 2, only different operation stages will be described.

The combustion gas including the combustion residue moves from the first cylindrical space 35 to the second cylindrical space 36. Part of the gas changes the direction of flow by 90 degrees and passes through the second communication holes 41, whereas the remaining part of the gas enters the pocket portion 38, then collides with the annular end surface 37, changes the direction, enters the inside of the cup member 40 from the second communication holes 41, and breaks the seal tape 45.

The gas flow then collides with the bottom 12c of the diffuser portion 12, changes the direction, and is discharged from the gas discharge port 15.

When the combustion gas enters the annular pocket portion 38, it comes in contact with the annular filter 80, so that most of the combustion residue in the combustion gas is collected in the annular filter 80, and part of the residue is also collected at the inner surface of the annular pocket portion 38 bare of the annular filter 80.

The annular pocket portion 38 is a space in which the combustion gas temporarily stays, rather than a space through which the combustion gas flow passes. For this reason, the annular pocket portion is unlikely to be affected by the combustion gas flow, and therefore, the combustion residue collected in the annular filter 80 is unlikely to scatter. In particular, since there is a space between the annular filter 80 and the cylindrical housing 10, the combustion residue is likely to adhere to the annular end surface 37 of the pocket portion 38 and the surface of the annular filter 80.

By contrast, when the annular filter 80 is disposed in the gas discharge passage through which the combustion gas flow passes from the upstream side to the downstream side, even though the combustion residue is collected by the annular filter 80, the collected combustion residue may be scattered by the subsequent combustion gas flow.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising
a cylindrical housing in which an ignition device is attached at a first end portion thereof and a diffuser portion provided with a gas discharge port is attached at a second end portion thereof,
an annular end surface which is in contact with an inner wall surface of the cylindrical housing being formed between the second end portion of the cylindrical housing and the diffuser portion,
a cylindrical flow path forming member being disposed in the cylindrical housing and extending from the side of the first end portion toward the second end portion,
an inner space of the cylindrical flow path forming member being partitioned by a partition wall into a first chamber on the side of the first end portion and a second chamber on the side of the second end portion,
a space, which includes the first chamber in the cylindrical flow path forming member, being a combustion chamber filled with a gas generating agent, and the second chamber in the cylindrical flow path forming member forming part of a gas discharge path for a combustion gas generated by combustion of the gas generating agent to enter the diffuser portion,
in the cylindrical flow path forming member,
an upstream end portion being positioned on the side of the first end portion of the cylindrical housing, a downstream end portion being positioned on the side of the second end portion of the cylindrical housing, and the downstream end portion being abutted against the annular end surface,
a first cylindrical space being formed between a first wall surface of the cylindrical flow path forming member on the side of the first chamber and the inner wall surface of the cylindrical housing, a second cylindrical space being formed between a second wall surface of the cylindrical flow path forming member on the side of the second chamber and the inner wall surface of the cylindrical housing, and the first cylindrical space and the second cylindrical space being arranged to form a space continuous in an axial direction, and
a plurality of first communication holes being formed in the first wall surface on the side of the first chamber and a plurality of second communication holes being formed in the second wall surface on the side of the second chamber,
the second cylindrical space being a cylindrical space with a length L from a boundary with the first cylindrical space to the annular end surface, and having an annular pocket portion with a length L1 from the annular end surface to the second communication holes, and
at least part of an inner circumferential surface of the annular pocket portion being provided with a concave-convex portion as means for collecting a combustion residue included in the combustion gas generated by combustion of the gas generating agent.

2. The gas generator according to claim 1, wherein the concave-convex portion for collecting the combustion residue generated by combustion of the gas generating agent is formed in the range of L1 on an outer circumferential surface of the second wall surface on the side of the second chamber.

3. The gas generator according to claim 1, wherein the concave-convex portion for collecting the combustion residue generated by combustion of the gas generating agent includes concave portions continuously formed in the circumferential direction and convex portions continuously formed in the circumferential direction, and the concave portions and the convex portions are arranged alternately in the axial direction in the range of L1 on an outer circumferential surface of the second wall surface on the side of the second chamber.

4. The gas generator according to claim 1, wherein the concave-convex portion for collecting the combustion residue generated by combustion of the gas generating agent includes concave portions continuously formed in the circumferential direction and convex portions continuously formed in the circumferential direction, the concave portions and the convex portions are arranged alternately in the axial direction in the range of L1 on an outer circumferential surface of the second wall surface on the side of the second chamber, and the convex portions are inclined toward the annular end surface.

5. The gas generator according to claim 1, wherein in the concave-convex portion for collecting the combustion residue generated by combustion of the gas generating agent, a height difference between the concave portion and the convex portion is within a range of 0.2 mm to 2 mm.

6. A gas generator comprising
   a cylindrical housing in which an ignition device is attached at a first end portion thereof and a diffuser portion provided with a gas discharge port is attached at a second end portion thereof,
   an annular end surface which is in contact with an inner wall surface of the cylindrical housing being formed between the second end portion of the cylindrical housing and the diffuser portion,
   a cylindrical flow path forming member being disposed in the cylindrical housing and extending from the side of the first end portion toward the second end portion,
   an inner space of the cylindrical flow path forming member being partitioned by a partition wall into a first chamber on the side of the first end portion and a second chamber on the side of the second end portion,
   a space, which includes the first chamber in the cylindrical flow path forming member, being a combustion chamber filled with a gas generating agent, and the second chamber in the cylindrical flow path forming member forming part of a gas discharge path for a combustion gas generated by combustion of the gas generating agent to enter the diffuser portion,
   in the cylindrical flow path forming member,
      an upstream end portion being positioned on the side of the first end portion of the cylindrical housing, a downstream end portion being positioned on the side of the second end portion of the cylindrical housing, and the downstream end portion being abutted against the annular end surface,
      a first cylindrical space being formed between a first wall surface of the cylindrical flow path forming member on the side of the first chamber and the inner wall surface of the cylindrical housing, a second cylindrical space being formed between a second wall surface of the cylindrical flow path forming member on the side of the second chamber and the inner wall surface of the cylindrical housing, and the first cylindrical space and the second cylindrical space being arranged to form a space continuous in an axial direction, and
      a plurality of first communication holes being formed in the first wall surface on the side of the first chamber and a plurality of second communication holes being formed in the second wall surface on the side of the second chamber,
   the second cylindrical space being a cylindrical space with a length L from a boundary with the first cylindrical space to the annular end surface, and having an annular pocket portion with a length L1 from the annular end surface to the second communication holes, and
   an annular filter being disposed in the annular pocket portion as means for collecting a combustion residue included in the combustion gas generated by combustion of the gas generating agent.

7. The gas generator according to claim 6, wherein the annular filter is disposed such that at least the inner circumferential surface thereof is abutted against an outer circumferential surface of the second wall surface on the side of the second chamber and that the annular filter occupies part of a space of the annular pocket portion.

8. The gas generator according to claim 6, wherein the annular filter has a bulk density of 1 to 3 g/cm$^3$.

* * * * *